J. M. GALLOWAY & A. W. TREVOR.
TUBE REPAIRING DEVICE.
APPLICATION FILED JAN. 2, 1909.
925,323.  Patented June 15, 1909.
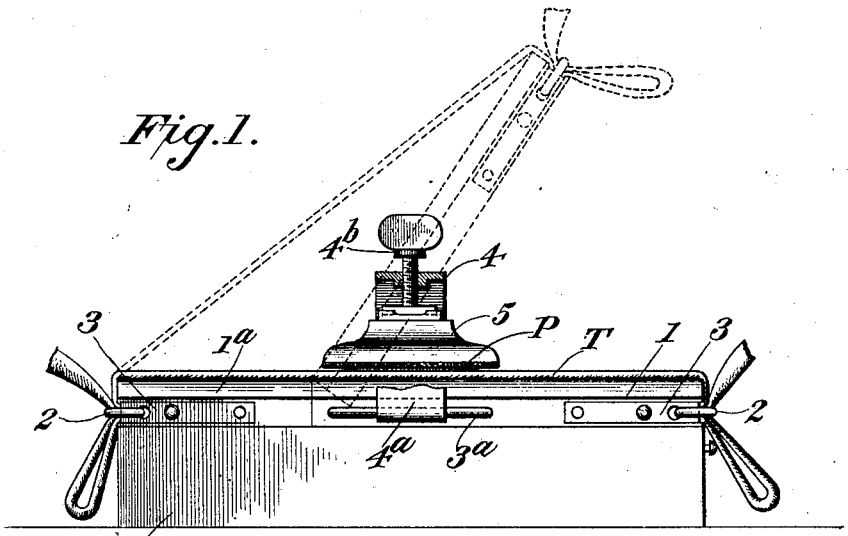
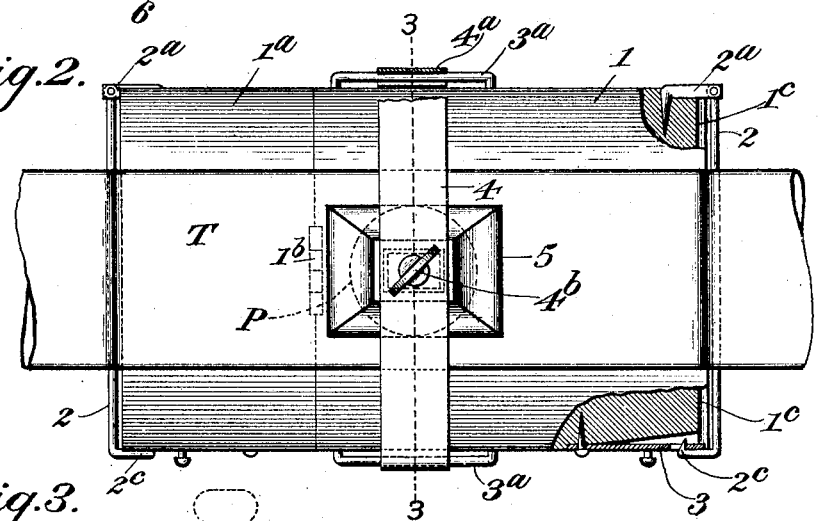
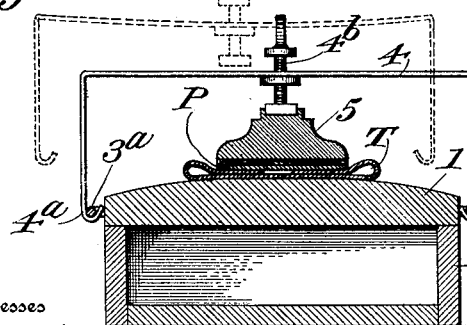
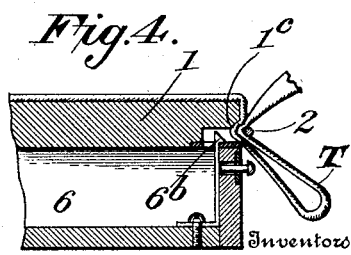
Witnesses
Inventors
James M. Galloway
Alexander W. Trevor
By Alexander & Dowell
Attorneys

UNITED STATES PATENT OFFICE.

JAMES M. GALLOWAY AND ALEXANDER W. TREVOR, OF ROCK ISLAND, ILLINOIS, ASSIGNORS TO THE ROCK ISLAND SPECIALTY MANUFACTURING COMPANY, OF ROCK ISLAND, ILLINOIS, A CORPORATION OF ILLINOIS.

TUBE-REPAIRING DEVICE.

No. 925,323.    Specification of Letters Patent.    Patented June 15, 1909.

Application filed January 2, 1909. Serial No. 470,323.

*To all whom it may concern:*

Be it known that we, JAMES M. GALLOWAY and ALEXANDER W. TREVOR, of Rock Island, county of Rock Island, and State of Illinois, have invented certain new and useful Improvements in Tube-Repairing Devices; and we hereby declare that the following is a full, clear, and exact description thereof, reference being had to the accompanying drawings, which form part of this specification.

This invention relates to means for repairing rubber tubes and the like, and is particularly intended for use in applying patches to the inner tubes of pneumatic tires; and the objects of the invention are to provide novel means for stretching the part of the tube to which a patch is to be applied; and to provide novel means for holding the patch against the tube until the cement is set.

A subsidiary object of the invention is to provide a novel repair kit in the form of a box adapted to contain all materials necessary to make such repairs, and also parts of the clamping device, when not in use,— the upper part of such box forming the tube stretching device; and the box cover forming part of the means by which the tube is stretched; and also the lower member of the clamp by which the patch is held to the stretched tube until the cement has set.

We will now describe the invention in detail with reference to the form illustrated in the accompanying drawings, and set forth in the claims the parts and combinations of parts for which protection is desired.

In the drawings—Figure 1 is a side view of the repair kit, as in use for patching an inner tube; showing the tube stretched and the patch clamp applied, in full lines; and showing in dotted lines the position of the parts preparatory to stretching the tube. Fig. 2 is a plan view of Fig. 1, partly broken. Fig. 3 is a sectional view on line 3—3, Fig. 2, showing the clamp disengaged in dotted lines. Fig. 4 is a detail sectional view.

In the embodiment of the invention illustrated in the drawings the tube stretching device is composed of two plates or boards 1, 1ª, the inner ends of which are hinged together at 1ᵇ, and the outer ends of these plates are provided with retainers to engage a tube As shown each retainer comprises a rod 2 which is pivoted at one end to a stud 2ª fastened to one corner of the plate, and the free end of the retainer rod is bent to form a hook 2ᶜ adapted to engage a spring-catch 3 fastened to the other corner of the plate as indicated in the drawings, so as to hold the retainer in closed position close against the outer end of the plate. The outer end of the plate is grooved as shown at 1ᶜ adjacent the retainer 2 to facilitate the clamping of the tube between the retainer and the edge of the plate. The outer end of each plate is provided with a similar clamp. The plate 1 is preferably longer than the other, and is provided on its sides with long staples or keepers 3ª, which are adapted to be engaged by the hooked ends 4ª of a bail-shaped clamp 4 which is adapted to be arranged transversely of the plate as shown in the drawings. The legs 4ª of clamp 4 are preferably made sufficiently resilient to enable them to be sprung into or out of engagement with keepers 3ª. Through the center of this bail 4 is tapped a screw 4ᵇ which is adapted to engage the upper side of a presser block 5 which may be placed over a patch P on the outer side of the tube T, and may be clamped thereagainst with any desired pressure by manipulating the screw 4ᵇ.

In repairing a tube the device may be operated as follows: The tube, indicated at T in the drawings, is clamped at a point adjacent the plate to be patched between one of the retainers 2 and edge of plate 1ª. The plate 1 may be then raised to the position indicated in dotted lines in Fig. 1 and another portion of the tube, at the other side of the part to be repaired, is clamped between the other retainer 2 and the edge of the plate 1. The tube may be doubled between the retainer and plate edge if necessary in order to cause the retainers to hold it securely. The plate 1 is then lowered into alinement with the plate 1, thereby stretching the tube tautly over the plates; the patch P is then applied over the hole in the tube and cemented in the usual manner; then the presser-block 5 is placed over the patch and the clamp 4 is placed over the presser-block and its legs 4ª sprung into engagement with the keepers 3ª and the desired pressure is then applied to the patch by manipulating the screw 4ᵇ. The parts are then left in this condition until the cement has set, and the patch properly secured to the tube. This operation can be performed very quickly, and while the cement is setting the workman can attend to other matters.

We do not wish to be restricted to the specific construction of parts shown in the drawings, as the invention can be embodied in various equivalent mechanical constructions.

The invention is useful in repair shops, and is also particularly designed for use of automobilists and bicyclists. And, for the latter purpose, as shown in the drawings, the plates 1, 1ª, may form the top of a box 6, the plate 1ª can be fast to the top of such box and the plate 1 form a hinged cover for the box, such cover 1 being normally held closed by a suitable catch as indicated at 6ᵇ. The box is of such size that when not in use the clamp 4 and presser-block 5 can be placed therein; and also a supply of patches, and cement and other materials necessary for patching tubes can be carried in the box.

By having the plates 1, 1ª, hinged together they form an efficient stretching device and hold the inner tube taut during the cementing operation. The tube is crimped by the retainers 2 into the grooves 1ᶜ so that it will be securely held during the repairing operation. The device holds the tube under tension during the cementing operation and holds the patch securely upon the stretched tube; and the tube can be readily cleansed around the part to be repaired after it is stretched—thus insuring thorough adhesion of the patch to the tube.

Having described our invention what we claim as new and desire to secure by Letters Patent thereon is:

1. In combination, a support, means for stretching an article to be patched upon said support, a clamp attached to said support, and a presser-block interposed between the clamp and the article.

2. In a tube repairing device, the combination of a support, means for stretching a tube upon said support, a clamp detachably attached to said support, a presser-block interposed between the clamp and the tube, and a screw in said clamp engaging said block.

3. In combination, a support, a pair of retaining devices connected therewith adapted to engage the article to be repaired, a spring clamp having its legs detachably connected with the side of said support, and a presser-block interposed between the support and said clamp.

4. In a tube patching device, the combination of a support, a pair of retaining devices connected therewith adapted to engage a tube at opposite sides of the hole to be patched, a clamp connected with said support, a presser-block interposed between the support and said clamp, and a screw tapped through said clamp engaging said block.

5. In a tube repairing device, the combination of a pair of hinged plates, a tube retaining device on each plate, a clamp member connected to the plates, and a presser-block interposed between the clamp and plates, substantially as described.

6. In a tube repairing device, the combination of a pair of hinged plates, a tube retaining device attached to the outer end of each plate, a spring clamp detachably engaged with one of the plates, and a presser block interposed between said clamp and said plate.

7. In a tube repairing device, the combination of a pair of plates hinged at their inner ends and each having a recessed outer edge, rods attached to the ends of each plate, a bail-shaped clamp-member connected with the plates, a presser-block interposed between said clamp member and the plate, and a screw tapped through the clamp member.

8. In a tube repairing device, the combination of a pair of plates hinged at their inner ends and each having a recessed outer end, retaining rods attached to the ends of each plate, keepers at the side of one plate, a spring clamp-member adapted to engage the keepers, a presser-block interposed between said clamp member and the plate, and a screw tapped through the clamp member and engaging said block.

9. In a repair kit for pneumatic tubes and the like, the combination of a box, a cover therefor comprising one fixed and one hinged plate, tube retaining devices attached to the outer ends of the box cover, a clamp overlying one of the plates, and a presser-block adapted to be placed between said clamp and the said plate and over the tube.

10. In a repair kit for pneumatic tubes and the like, the combination of a box, a cover therefor comprising one fixed and one hinged plate, tube retaining devices attached to the ends of the box, keepers at the side of the box, a clamp adapted to engage the keepers, and a presser-block adapted to be placed between said clamp and the tube, substantially as described.

In testimony that we claim the foregoing as our own, we affix our signatures in presence of two witnesses.

JAMES M. GALLOWAY.
ALEXANDER W. TREVOR.

Witnesses:
J. E. SPENCER,
T. B. DAVIS